(12) United States Patent
Momose et al.

(10) Patent No.: US 6,753,920 B1
(45) Date of Patent: Jun. 22, 2004

(54) ELECTRONIC CAMERA FOR PRODUCING AN IMAGE HAVING A WIDE DYNAMIC RANGE

(75) Inventors: Takumi Momose, Hachioji (JP); Hidetoshi Fukuda, Yokohama (JP); Hiroaki Koseki, Kokubunji (JP); Minoru Kakinuma, Hachioji (JP); Osamu Inagaki, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/384,414

(22) Filed: Aug. 27, 1999

(30) Foreign Application Priority Data

Aug. 28, 1998 (JP) ............................................. 10-243314

(51) Int. Cl.[7] ........................ H04N 5/222; H04N 5/238
(52) U.S. Cl. ...................................... 348/371; 348/364
(58) Field of Search ........................... 348/221.1, 222.1, 348/223.1, 224.1, 229.1, 230.1, 362–367, 370, 371; 396/61, 62

(56) References Cited

U.S. PATENT DOCUMENTS

| | | | |
|---|---|---|---|
| 4,647,975 A | | 3/1987 | Alston et al. ............. 348/222.1 |
| 5,229,856 A | * | 7/1993 | Koshiishi ..................... 348/367 |
| 5,264,944 A | * | 11/1993 | Takemura ................. 348/224.1 |
| 5,638,118 A | * | 6/1997 | Takahashi ................ 348/221.1 |
| 5,752,093 A | * | 5/1998 | Ishiguro ...................... 396/61 |
| 6,278,490 B1 | * | 8/2001 | Fukuda ....................... 348/362 |

FOREIGN PATENT DOCUMENTS

| | | | |
|---|---|---|---|
| EP | 0387817 | 9/1990 | .......... H04N/5/238 |
| EP | 0487332 | 5/1992 | ............ H04N/3/15 |
| EP | 0828383 | 3/1998 | .......... H04N/5/232 |
| EP | 0836319 | 4/1998 | ............ H04N/3/15 |
| JP | 62108678 | 5/1987 | .......... H04N/5/335 |
| JP | 4207581 | 7/1992 | .......... H04N/5/235 |
| WO | WO9736427 | 10/1997 | ............ H04N/9/73 |

OTHER PUBLICATIONS

European Search Report dated Dec. 13, 1999.

* cited by examiner

*Primary Examiner*—Ngoc-Yen Vu
(74) *Attorney, Agent, or Firm*—Stevens, Davis, Miller & Mosher, LLP.

(57) ABSTRACT

An electronic camera for producing a composite image having a wide dynamic range and a high quality by composing first and second image signals obtained by picking-up an object successively two times with first and second stroboscopic flash exposures having a predetermined exposure amount ratio, including a CCD image sensing element, a stroboscopic flash device, and a flash light control circuit for controlling an excited emission of said stroboscopic flash device. At an end of the first exposure, the excited light emission from the stroboscopic flash device is temporarily stopped, but an excited condition of the stroboscopic flash device is kept. During this very short light emission interruption period, electrostatic charges stored in a light receiving section of the CCD image sensing element during the first exposure are transferred into a vertical transfer section. After that, the excited flash light is emitted again to perform the second exposure without recharging a trigger capacitance.

20 Claims, 8 Drawing Sheets

ELECTRONIC CAMERA FOR PRODUCING AN IMAGE HAVING A WIDE DYNAMIC RANGE

BACKGROUND OF THE INVENTION

1. Field of the Invention

The present invention relates to an electronic camera for producing an image having a wide dynamic range by composing or synthesizing two image signals obtained by picking-up an object two times with a desired exposure amount ratio with the aid of a single solid state image sensing element, and more particularly to an electronic camera for producing a composed image having a wide dynamic range as well as a high quality by utilizing a flash light emitting device, e.g. stroboscopic flash device. Such an electronic camera is generally called a filmless digital still camera.

2. Description of the Related Art

In the electronic camera, use is generally made of a solid state image sensing element such as CCD image sensing element. It is well known that such a solid state image sensing element is liable to be saturated with a relatively low luminance and has a low S/N for a lower luminance. Therefore, there is a problem that a dynamic range of the solid state image sensing element is very narrower than a conventional photographic film.

In order to solve such a problem, there has been proposed an electronic camera, in which an image having an extended dynamic range is obtained by composing two image signals which are produced by a single solid state image sensing element when an object is picked-up with different exposure amounts two times successively. For instance, in Japanese Patent Application Laid-open Publication Kokai Hei 4-207581, there is disclosed an electronic camera, in which immediately after transferring signal charges stored in a light receiving section of a solid state image sensing element during a first exposure into a transfer section of the element, a second exposure having a longer exposure time than the first exposure is initiated, and signal charges stored in the light receiving section during the second exposure are transferred into the transfer section after the signal charges of the first exposure have been outputted from the solid state image sensing element. In this manner, the second exposure can be performed for a time interval during which the signal charges produced by the first exposure and transferred into the vertical transfer section are read out of the solid state image sensing element, and therefore it is possible to obtain two image signals with a short time interval. Then, the thus obtained two image signals are composed to derive a composed image having a wider dynamic range.

Further, in Japanese Patent Application Laid-open Publication Kokai Sho 62-108678, there is disclosed an electronic camera, in which upon producing an image with a wide dynamic range by composing two image signals obtained with different exposure amounts, one of the image signals is obtained by picking-up an object under the natural light, and the other image signal is obtained by picking-up the same object with a stroboscopic flash light, and these image signals are compared with each other to extract image portions having a larger amplitude to obtain a composed image.

In general, when an object has a lower luminance level, the image is picked-up with stroboscopic flash light. However, in case of obtaining an image with a wide dynamic range by composing two image signals obtained with different exposure amounts, when one of the image signals is obtained with the natural light and the other image signal is obtained with the flash light and the thus obtained two image signals are merely composed, it is difficult to obtain the two image signals with a desired exposure amount ratio in a highly precise manner although exposure times are set accurately owing to the fact that stroboscopic flash light fluctuates largely.

Furthermore, when the stroboscopic flash light is used, a portion of an object which is irradiated with the stroboscopic flash light can be picked-up such that the image signal with the stroboscopic flash light can have the given exposure amount ration with respect to the image signal with the natural light, but at apportion of the object which is not irradiated with the stroboscopic flash light, only the image signal with a same exposure amount as that with the natural light is obtained by the second exposure, and therefore there is a problem that the image picking-up operations could not be conducted with a desired exposure amount ratio between the first and second shots. Moreover, since a white balance of the image signal with the natural light differs from that with the stroboscopic flash light, when the image signals are composed, a color balance might be partially lost.

In order to solve the above mentioned problems, there has been proposed an electronic camera, in which first and second image picking-up operations are carried out successively with stroboscopic flash light to produce two image signals, and the thus obtained two image signals are synthesized to form a composed image. When both the two image signals to be composed are derived with the stroboscopic flash light, it is easy to perform the first and second image picking-up operations with a desired exposure amount ratio over a whole image area, and therefore it is possible to obtain a composed image having a wide dynamic range and having a uniform white balance over a whole image.

In this case, there may be provided two sets of stroboscopic flash devices each comprising a Xenon tube, a trigger capacitance and a light emission capacitance, these stroboscopic flash devices are alternately used for the first and second exposures. However, it is apparent that the electronic camera including such a system is liable to be high in cost, large in size and heavy in weight. Therefore, it is desired that the two image picking-up operations are performed by means of a single stroboscopic flash device which is used in a conventional camera in which no image signal composition is carried out.

In this case, when the stroboscopic flash device is operated for the two exposures like as the conventional stroboscopic flash exposure, i.e. when the trigger capacitance is charged and a trigger voltage is applied to the Xenon tube each time the stroboscopic flash exposure is carried out, two image signals could not be obtained with a short time interval. This is due to the fact that in general, the trigger capacitance is charged through a resistor, and therefore a relatively long time period such as 6 msec is required for the trigger capacitance due to a time constant of the triggering circuit until the trigger capacitance is charged up to an effective trigger voltage. This results in that the second exposure could not be initiated immediately after the completion of the first exposure. In this manner, a relatively long time interval is required from the end of the first exposure to the start of the second exposure. This affects the second exposure and its shutter speed, and particularly when the object includes a moving subject, a portion of the composed image corresponding the relative movement might be deteriorated. In case of the color image, false color or false contour might be produced.

Moreover, when the second exposure is performed by applying the electrostatic charge stored in the trigger capacitance as the trigger voltage to the Xenon tube like as the conventional stroboscopic flash exposure, the trigger voltage having an amplitude of several KVs might produce undesired noise, and if this second triggering period overlaps with the storing period or transferring period of the signal charges of the first exposure, the image signal obtained with the first exposure might be deteriorated.

SUMMARY OF THE INVENTION

The present invention has for its object to provide a novel and useful electronic camera, which can solve the above mentioned problems and can produce a composed image having a high quality and a wide dynamic range by conducting first and second exposures with flash light.

According to the invention, an electronic camera producing an image having a wide dynamic range by composing two image signals obtained by picking-up an object two times successively with different exposure amounts, comprises:

an image picking-up means including a solid state image sensing element for picking-up an object to derive an image signal;

a flash light emitting means for irradiating said object with flash light;

an image signal composing means for composing two image signals obtained by picking-up the object two times with a desired exposure amount ratio; and a flash light emission controlling means for controlling an excited emission of said flash light emitting means in accordance with said desired exposure amount ratio such that upon the first exposure, said flash light emitting means is excited and the flash light is emitted, an excited condition of the flash light emitting means is kept over said second exposure, and after once stopping the light emission at an end of the first exposure, the flash light is emitted again to perform the second exposure.

In the electronic camera according to the invention, said flash light emitting means is constituted by a conventional stroboscopic flash device including a discharge tube such as a Xenon tube, and the discharge tube is kept in the excited condition from the start of the first exposure to the end of the second exposure. Therefore, it is no more necessary to recharge a trigger capacitance between the first exposure and the second exposure, and thus the two exposures can be carried out with the desired exposure amount ratio, while a time interval between the first exposure and the second exposure can be shortened. Therefore, even if the object including a moving subject, it is always possible to obtain a composed image having a high quality.

In an embodiment of the electronic camera according to the invention, said image picking-up means is constructed such that electrostatic charges stored in a light receiving section of the solid state image sensing element during the first exposure are transferred into a vertical transfer section of the solid state image sensing element during the time interval between the first exposure and the second exposure during which the excited light emission is stopped. In this embodiment, the first image signal is no more affected by the excited light emission for the second exposure, and therefore it is possible to attain the image signal having a high S/N, and the time interval during which the excited light emission is interrupted can be further shortened.

In another preferable embodiment of the electronic camera according to the invention, said flash light emission controlling means includes an exposure control table which represents a plurality of exposure control data values for the first exposure and a plurality of exposure control data values for the second exposure, said exposure control data values determining excited light emission times for the first and second exposures in accordance with said desired exposure amount ratio, and the excited light emission is controlled by selecting, from said exposure control table, exposure control data values corresponding to an image picking-up condition.

Then, the first and second image picking-up operations can be performed accurately in accordance with the desired exposure amount ratio by selecting exposure control data values in accordance with a image picking-up condition for attaining correct exposure. In this embodiment, it is preferable that said flash light emitting means comprises a flash light source, a trigger capacitance for driving said flash light source into an excited condition, and an light emission capacitance for supplying a light emitting energy to said flash light source in the excited condition to emit an excited light. The exposure control data values for the first exposure in said exposure control table of said flash light emission controlling means are determined on the basis of a reference voltage of said light emission capacitance, and the exposure control data values for the second exposure are determined on the basis of a voltage across said light emission capacitance which is determined by considering a voltage drop due the excited light emission for the first exposure. In this embodiment, it is possible to attain much more accurate exposure control data values corresponding to the predetermined exposure amount ratio.

Alternatively, said plurality of exposure control data values of the first and second exposures may be constructed by exposure control data values for a conventional single exposure in which no image composition is carried out. In such a case, a memory for storing the exposure control data values can have a smaller capacity, and the whole camera can be cheap in cost.

Furthermore, in the above preferable embodiment, said flash light emission controlling means includes a voltage detecting means for detecting a voltage across said light emission capacitance, and the excited light emission is controlled by selecting, from said exposure control table, an exposure control data value for the first exposure and an exposure control data value for the second exposure suitable for an exposure condition on the basis of a comparison of the detected voltage with the reference voltage. In this case, in the first exposure, even if the light emission capacitance is not fully charged up to the reference voltage, it is possible to attain much more accurate exposure control data values corresponding to the desired exposure amount ratio.

In the electronic camera according to the invention, said image picking-up means includes a variable stop which is controlled in accordance with a distance from the camera to the object, and exposure control data values for the first and second exposure control data values are selected from said exposure control table on the basis of a figure of the variable stop, i.e. stop value. In this case, for instance, when a distance to the object is short, the stop value may be increased to extend a workable range to a shorter distance side, and the image pick-up with a short distance, i.e. close-up shot can be easily realized.

Furthermore, in the electronic camera according to the invention, said flash light emitting means is controlled by said flash light emission controlling means such that flat light is emitted from said flash light emitting means in each of said first and second exposures. In this manner, during respective exposures, the flash light emitting means is operated to emit the excited light in a pulsatory manner with a short time non-emission interval, and therefore exposure amounts can be controlled much more accurately and it is possible to attain the image having a much higher quality. It should be noted that the light emission interruption period between the first exposure and the second exposure according to the invention does not mean the very short time non-emission interval in such a pulsatory light emission, and both terms should not be confused.

It should be noted that according to the invention, said exposure amount ratio between the first exposure and the second exposure may be previously determined or may be determined in accordance with an image pick-up condition.

DESCRIPTION OF THE PREFERRED EMBODIMENT

Figure 1:
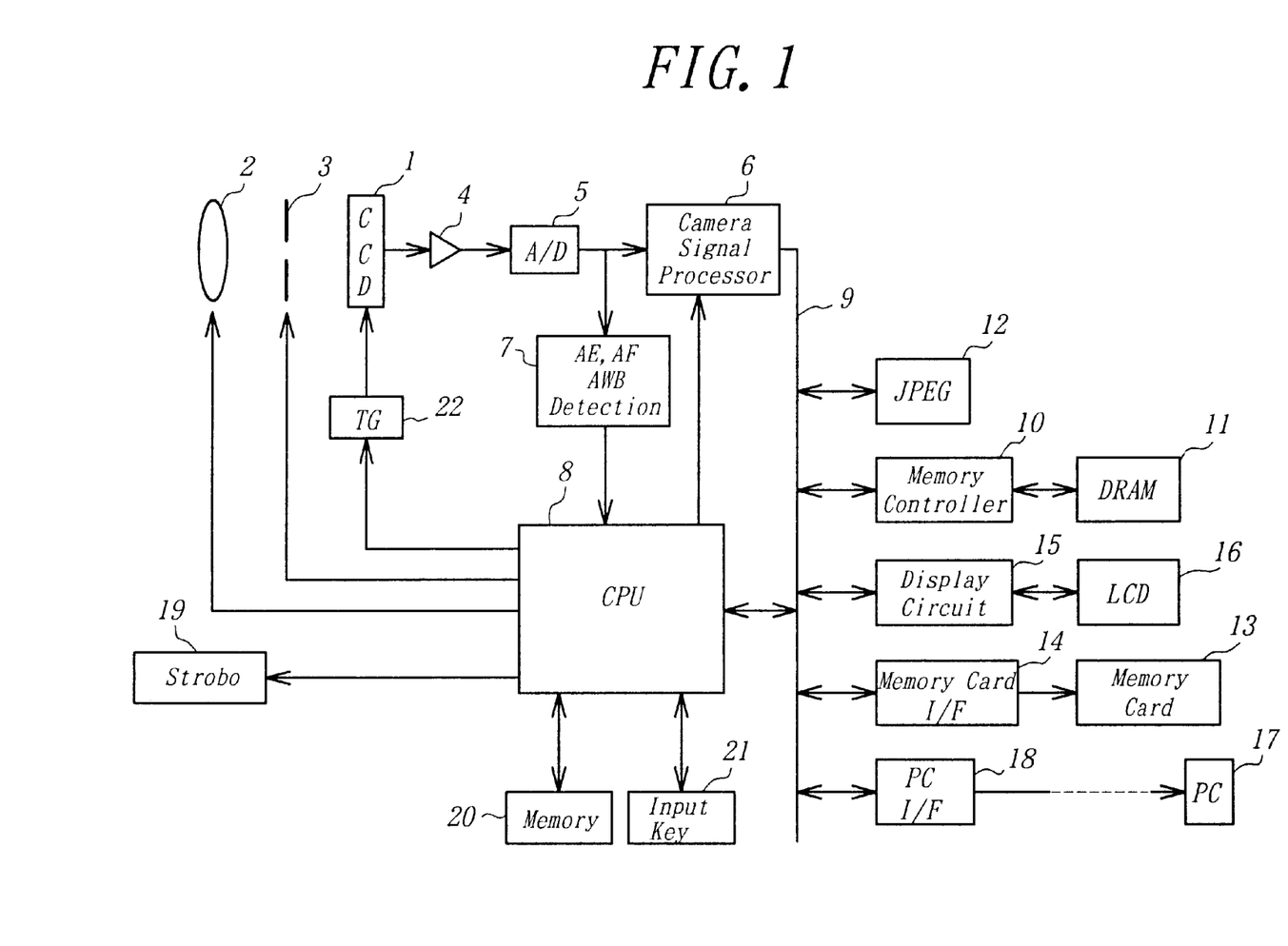
FIG. 1 is a block diagram showing a first embodiment of the electronic camera according to the invention.

FIG. 1 is a block diagram showing a whole structure of a first embodiment of the electronic camera according to the invention. The electronic camera of the present embodiment comprises a single plate type color CCD image sensing element 1, on to which is projected an image of an object by means of a lens unit 2 and a stop-shutter mechanism 3. The optical image of the object is then photo-electrically converted into an image signal. After removing noise in the image signal by means of a correlation double sampling circuit not shown, the image signal is amplified by an amplifier 4 and is converted into a digital image signal by an A/D converter 5. Then, the thus obtained digital image signal is supplied to a camera signal processing circuit 6 and is processed thereby as image data.

Figure 7:
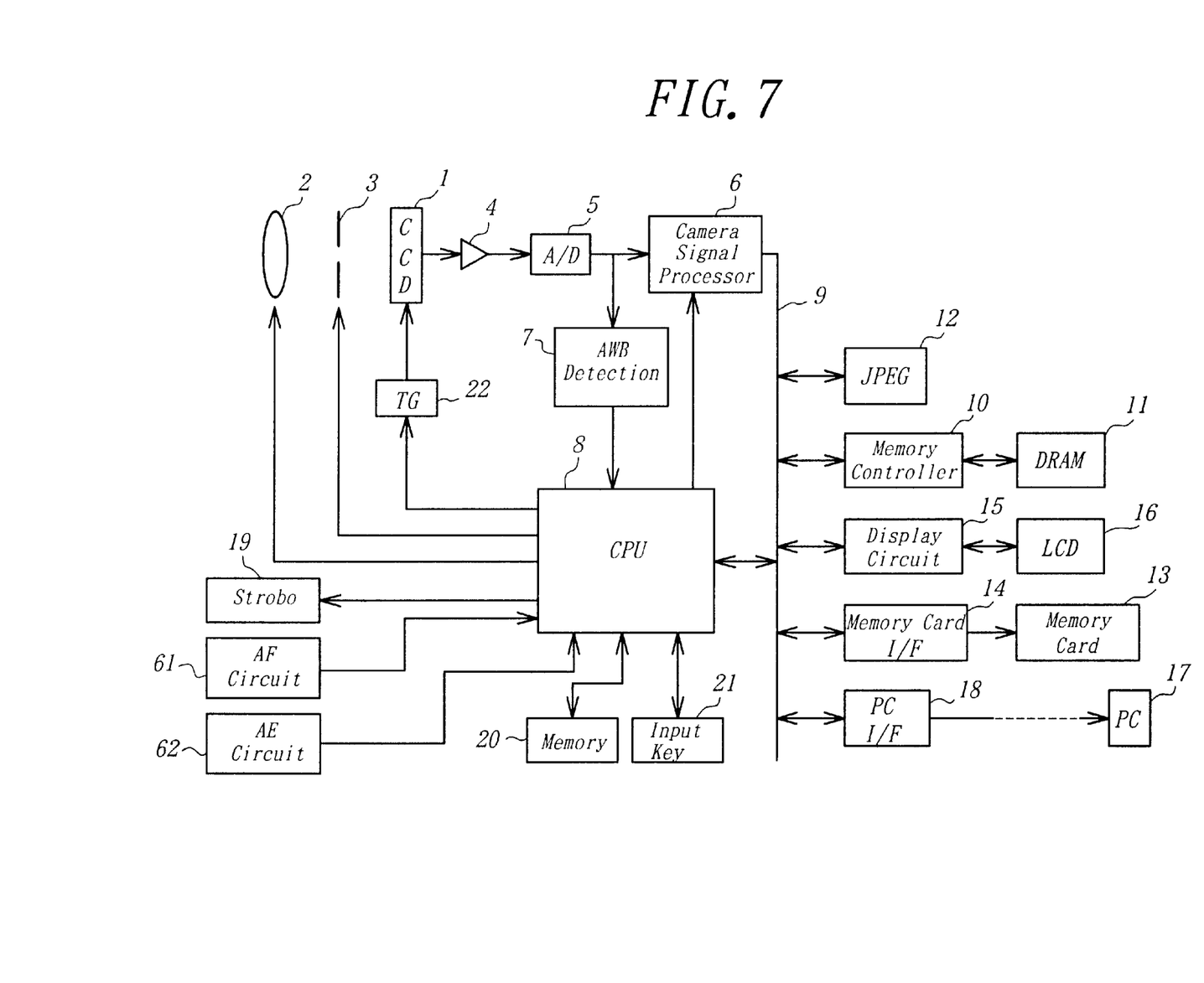
FIG. 7 is a block diagram showing a modified embodiment of the electronic camera according to the invention.

The output signal of the A/D converter 5 is also supplied to an AF (Automatic Focus), AE (Automatic Exposure), AWB Automatic White Balance) detection circuit 7, in which an AF detection processing for deriving AF information for automatically controlling a focus condition, an AE processing for deriving AE information for automatically controlling an exposure, and an AWB processing for deriving AWB information for automatically controlling a white balance. The AF information, AE information and AWB information from the AF, AE, AWB detection circuit 7 are supplied to the lens unit 2, the stop-shutter mechanism 3 and the camera signal processing circuit 6, respectively through CPU 8. It should be noted that the AF and AE functions performed by the AF, AE, AWB detection circuit 7 may be carried out by means of separate AF circuit 61 and AE circuit 62, respectively as shown in FIG. 7.

The camera signal processing circuit 6 and CPU 8 are connected to a bus line 9, to which are also connected a DRAM 11 through a memory controller 10, said DRAM being used as a working memory upon processing color of the image data, and an image compressing circuit (JPEG) 12 for compressing the image data supplied from the camera signal processing circuit 6. To the bus line 9, there are further connected a memory card I/F 14 for storing a compressed image signal data into a memory card 13, a liquid crystal display (LCD) 16 via a display circuit 15, and a PC I/F 18 for transferring the image data stored in the memory card 13 to a personal computer (PC) 17. Said LCD 16 displays an image stored in the memory card 13 and various image picking-up conditions.

To the CPU 8 are connected a stroboscopic flash device 19, a memory 20 storing an exposure control table denoting exposure control data values for controlling said stroboscopic flash device 19 in accordance with the AE information supplied from the AF, AE and AWB detection circuit 7 or the separate AF circuit 61 and AE circuit 62, and an input key 21 for setting various image pick-up modes and driving a trigger switch. The CCD image sensing element 1 is driven by a timing pulse from a timing generator (TG) 22 under the control of the CPU 8.

Figure 2:
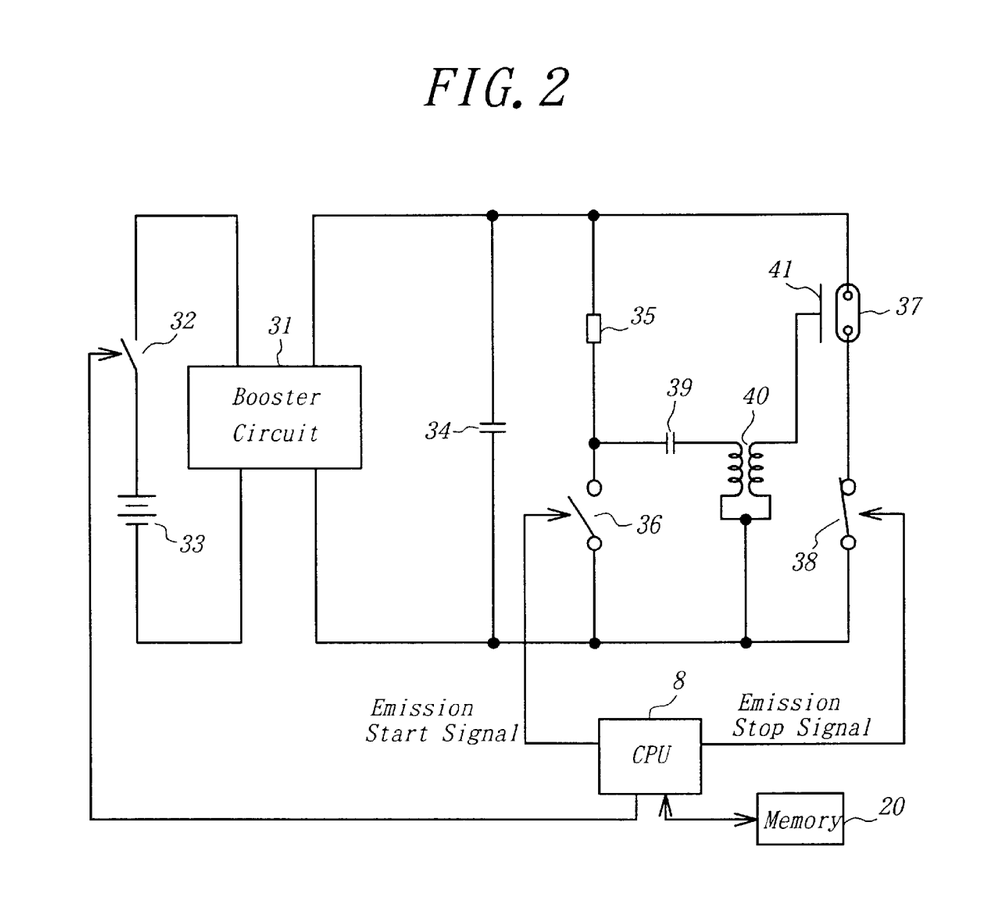
FIG. 2 is a circuit diagram illustrating an embodiment of a stroboscopic flash device shown in FIG. 1.

FIG. 2 is a circuit diagram showing an embodiment of the stroboscopic flash device 19 shown in FIG. 1. The stroboscopic flash device 19 includes a booster circuit 31 having a primary side connected to a battery 33 via a main switch 32. Across a secondary side of the booster circuit 31, there is connected a parallel circuit consisting of a series circuit of light emission capacitance 34, resistor 35 and normally opened semiconductor switch 36 a series circuit of a discharge tube, in the present embodiment, a Xenon tube 37 and normally closed semiconductor switch 38. Across the switch 36, there is connected a primary winding of a trigger transformer 40 via a trigger capacitance. A secondary winding of the trigger transformer 40 has one end connected to a connecting point between the primary winding and the switch 36 and the other end connected to a triggering electrode of the Xenon tube 37.

Under the control the CPU 8, when the main switch 32 is closed, the light emission capacitance 34 is charged, and at the same time the trigger capacitance 39 is charged via the resistor 35. When a light emission start signal is generated from the CPU 8, the switch 36 is closed for a short time period to discharge the trigger capacitance 39. Then, by means of the triggering transformer 40, a high voltage is applied to the triggering electrode 41 of the Xenon tube 37 to drive the Xenon tube into the excited condition. Under such an excited condition, the light emission capacitance 34 is discharged through the Xenon tube 37 to emit/excited light. The excited light emission is performed during the first exposure. At the end of the first exposure, the switch 38 is temporarily opened by means of a light emission stop signal from the CPU 8. Therefore, the excited light emission from the Xenon tube 37 is interrupted or stopped for a short time period, while the Xenon tube is kept still in the excited condition. Then, the switch 38 is closed and the excited, light is emitted again from the Xenon tube 37 to conduct a second exposure.

In the present embodiment, amounts of excited light emitted from the Xenon tube 37 during the first and second exposures are controlled in accordance with exposure control data stored in the memory 20 under the control of the CPU 8 such that an exposure amount of the second exposure corresponds to a correct exposure amount determined by the AE information or AF information supplied from the AF, AE, AWB detection circuit 7 or the separate AF circuit 61 or AE circuit 62, and an exposure amount of the first exposure is smaller than that of the second exposure by an amount corresponding to the predetermined exposure amount ratio with respect to the exposure amount of the second exposure. That is to say, in the present embodiment, the exposure amount of the first exposure is determined on the basis of the exposure amount of the second exposure. Hereinafter, the exposure with the first stroboscopic flash light is called SE (Short Exposure) and the exposure with the second stroboscopic flash light is called LE (Long Exposure).

Figure 3A:
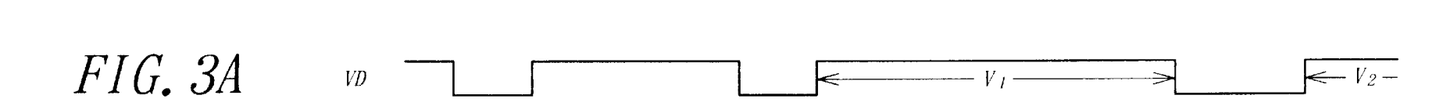
FIGS. 3A–3F are timing charts explaining the operation of the first embodiment shown in FIG. 1.
Figure 3B:
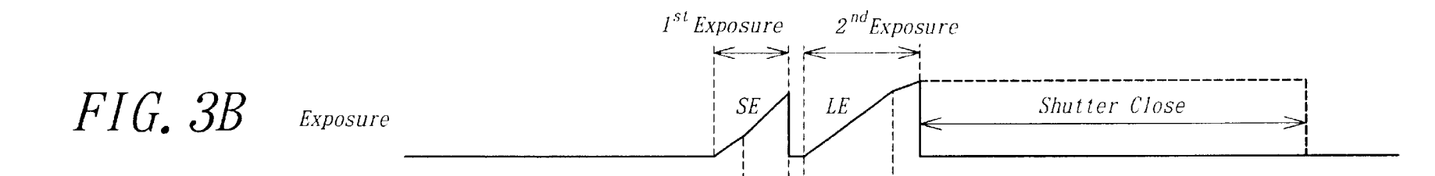
Figure 3C:
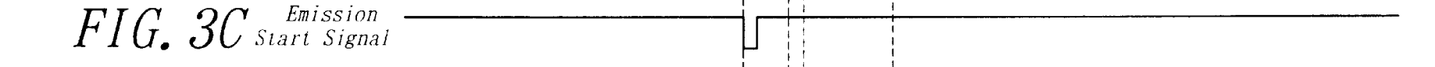
Figures 3D, 3E:
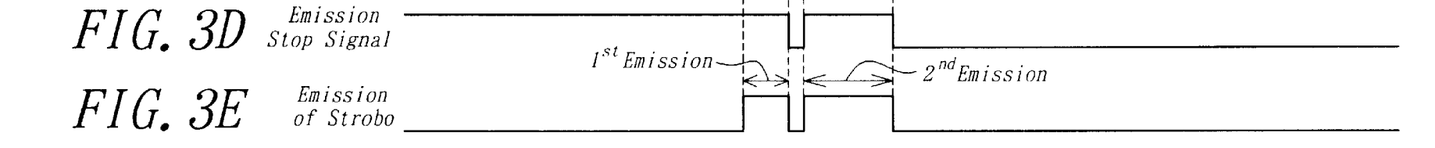
Figure 3F:
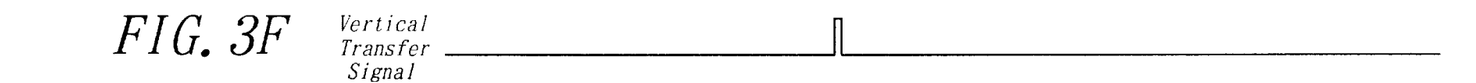

FIGS. 3A–3F are timing charts for explaining the operation of the first embodiment. FIG. 3A denotes a vertical synchronizing signal for controlling a transfer from the operation of the CCD image sensing element 1, FIG. 3B an exposure condition including an operation of the stop-shutter mechanism 3, FIG. 3C the light emission start signal for initiating the excited light emission from the Xenon tube 37 in the stroboscopic flash device 19, FIG. 3D the light emission stop signal for temporarily opening the switch 38 during the time interval between the first exposure and the second exposure, FIG. 3E the excited light emission from the Xenon tube 37 of the stroboscopic flash device 19, and FIG. 3F shows a vertical transfer signal for transferring electrostatic charges stored in a light receiving section of the CCD image sensing element 1 into a vertical transfer section. In this embodiment, in the image composition mode with the stroboscopic flash light, after charging the light emission capacitance 34 and trigger capacitance 39, the light emission start signal, i.e. trigger signal (FIG. 3C) having a duration of, for instance 20 μsec is generated from the CPU 8 in response to a release signal from the input key 21, and the excited light is emitted from the Xenon tube 37 to perform the first exposure. It should be noted that prior to the excited light emission, the first exposure is started in response to the operation of the mechanical stop-shutter mechanism 3. That is to say, the mechanical shutter is opened to start the first exposure. After that, when the exposure time determined by the exposure control data for the first exposure has elapsed, the CPU 8 generates the light emission stop signal (FIG. 3D) having a duration of, for instance, 15 μsec to stop the excited light emission from the Xenon tube 37 temporarily, while the Xenon tube is kept in the excited condition. During this interval, electrostatic charges stored in the light receiving section of the CCD image sensing element 1 are transferred into the vertical transfer section of the CCD image sensing element. This transfer requires only a very short time period such as 5 μsec. Therefore, the time interval during which the excited light emission is interrupted may be set to a value within a range from about 5 μsec to about 30 μsec. After that, when the switch 38 is closed again at the end of the light emission stop signal, the Xenon tube 37 initiates again to emit the excited flash light to conduct the second exposure. After elapsing a given exposure time, the CPU 8 produces again the light emission stop signal and the switch 38 is opened to stop the excited light emission from the Xenon tube 37.

As stated above, in the present embodiment, the light emission start signal is generated at such a timing that the light emission stop signal for stopping the emission of the excited light between the first exposure and the second exposure is generated within a time interval of the vertical blanking period of the vertical synchronizing signal VD. The stop-shutter mechanism 3 is opened in response to the actuation of the main switch 32 and is closed in response to the end of the second exposure. The electrostatic charges stored in the light receiving section of the CCD image sensing element 1 during the first exposure and transferred into the vertical transfer section during time interval during which the light emission is temporarily stopped is read out of the element during a period $V_1$ and the electrostatic charges stored in the light receiving section of the CCD image sensing element 1 during the second exposure are read out of the CCD image sensing element during a period $V_2$. Therefore, the stop-shutter mechanism 3 is kept closed at least at the end of the period $V_2$.

As explained above, the SE image signal obtained from the CCD image sensing element 1 by the first exposure and the LE image signal obtained by the second exposure are converted into SE digital image signal and LE digital image signal, respectively by the A/D converter 5, and the thus converted SE and LE digital image signals are processed by the camera signal processing circuit 6 and are stored in the DRAM 11 as SE image data and LE image data, respectively. After that, under the control of the CPU 8, image data of higher luminance regions of the object is extracted from the SE image data and image data of lower luminance regions is derived from the LE image data, and the thus extracted image data combined in accordance with a given image composition process to produce composed image data. Then, the composed image data is compressed by the compressing circuit 12 and the compressed image data is stored in the memory card 13.

In the present embodiment, the exposure control table stored in the memory 20 contains exposure control data values such that exposure control values for the first exposure are determined on the basis of a reference voltage which corresponds to a full charged voltage of the light emission capacitance 34 and exposure values are determined on the basis of the voltage across the light emission capacitance 35 at the end of the first exposure. It should be noted that as explained above, in the present embodiment, an amount of light of the second exposure corresponds to a correct amount of light determined by the light measurement data.

The following table 1 denotes an example of the exposure control table containing exposure control data values. In the table 1, 33 steps of combinations of stroboscopic flash emission times (μsec) for the first and second exposures under a given stop value, in each step, a light emission time for the first exposure is determined such that the first exposure amount is smaller than the second exposure amount by 3 EV (Exposure Value). Furthermore, second exposure amounts of successive steps differ from each other by 0.1 EV. As stated above, the light emitting times for the first exposure are determined on the basis of the reference voltage which appears across the fully charged light emission capacitance 34, and the light emitting times for the second exposure are determined on the basis of the voltage appearing across the light emission capacitance 34 at the end of the first exposure. Prior to the actually picking-up the object image, from the exposure control table, is selected a step which corresponds to a correct exposure amount determined in accordance with the AF and AE information supplied from the AF, AE, AWB detection circuit 7 or separate AF circuit 61 and AE circuit 62, the light emission from the stroboscopic flash device 19 is controlled in accordance with light emitting times for the first and second exposure in the selected step.

TABLE 1 exposure control table considering
voltage drop due to first exposure

| step | first exposure time | second exposure time |
|---|---|---|
| 1 | 23 | 79 |
| 2 | 25 | 85 |
| 3 | 26 | 105 |
| 4 | 27 | 107 |
| 5 | 28 | 110 |
| 6 | 29 | 115 |
| 7 | 30 | 120 |
| 8 | 31 | 125 |
| 9 | 32 | 130 |
| 10 | 33 | 134 |
| 11 | 34 | 144 |
| 12 | 35 | 169 |
| 13 | 37 | 174 |
| 14 | 39 | 195 |
| 15 | 42 | 201 |
| 16 | 42 | 215 |
| 17 | 45 | 229 |
| 18 | 48 | 273 |
| 19 | 52 | 352 |
| 20 | 55 | 382 |
| 21 | 56 | 412 |
| 22 | 58 | 420 |
| 23 | 60 | 486 |
| 24 | 62 | 544 |
| 25 | 64 | 635 |
| 26 | 66 | 660 |
| 27 | 70 | 900 |
| 28 | 73 | 989 |
| 29 | 78 | 1318 |
| 30 | 82 | 2142 |
| 31 | 86 | 4095 |
| 32 | 89 | 4095 |
| 33 | 94 | 4095 |

As explained above, in the first embodiment, use is made of the conventional stroboscopic flash device 19 in which the discharge tube is excited to emit flash light, and the discharge tube is kept in the excited condition from the start of the first exposure to the end of the second exposure, and therefore it is no more necessary to recharge the trigger capacitance 39 between the first and second exposures. Further, the second exposure can be performed immediately after the first exposure, the first and second exposures can be performed with the predetermined exposure amount ratio, while the time interval between the first and second exposures can be very short. In this manner, even if the object contains a moving subject, it is always possible to obtain the composed image having a high quality.

Furthermore, since the electrostatic charges stored in the light receiving section of the CCD image sensing element 1 during the first exposure are transferred into the vertical transfer section of the CCD image sensing element during the interval between the first and second exposures, the SE image signal obtained by the first exposure is not affected by the stroboscopic flash light emission for the second exposure and can have a good S/N, and the time interval between the first and second exposures can be further shortened.

Moreover, the exposure control table is composed in such a manner that the exposure control data values for the first exposure are determined on the basis of the reference voltage produced across the fully charged light emission capacitance 34 and the exposure control values for the second exposure are determined taking into account of the voltage drop due to the first exposure. Therefore, the first and second exposures can be conducted accurately with the predetermined exposure amount ratio and the image quality of the composed image can be further improved.

In a second embodiment of the electronic camera according to the invention, an exposure control table stored in the memory 20 is formed by a conventional exposure control table containing exposure control values for a conventional image pick-up operation with stroboscopic flash, and this table is commonly utilized for controlling the exposure amounts for the first and second exposures. In this case, the exposure control table contains steps denoting exposure control values for various exposure amounts at a given stop value with a step of 0.1 EV. In the image composing mode, at first a step for the second exposure is selected such that a relevant exposure amount corresponding to a correct exposure amount calculated prior to the actual exposure, and a step whose exposure amount is smaller than said exposure amount for the second exposure by the predetermined value, for instance 3 EV is selected for the first exposure. Then, the stroboscopic flash is controlled in accordance with light emitting times denoted by the thus selected steps.

By utilizing the exposure control table for the conventional image pick-up operation with the single stroboscopic flash also for controlling the stroboscopic flash for the first and second exposures, in addition to the merits of the first embodiment, the capacity of the memory 20 can be small and the whole camera can be less expensive. It should be noted that in the second embodiment, since the exposure control table is formed on the basis of the reference voltage appearing across the fully charged light emission capacitance 34, there is an small error in the exposure amount for the first exposure, but there is a few cases in which said error might affect the image composition.

Figure 4:
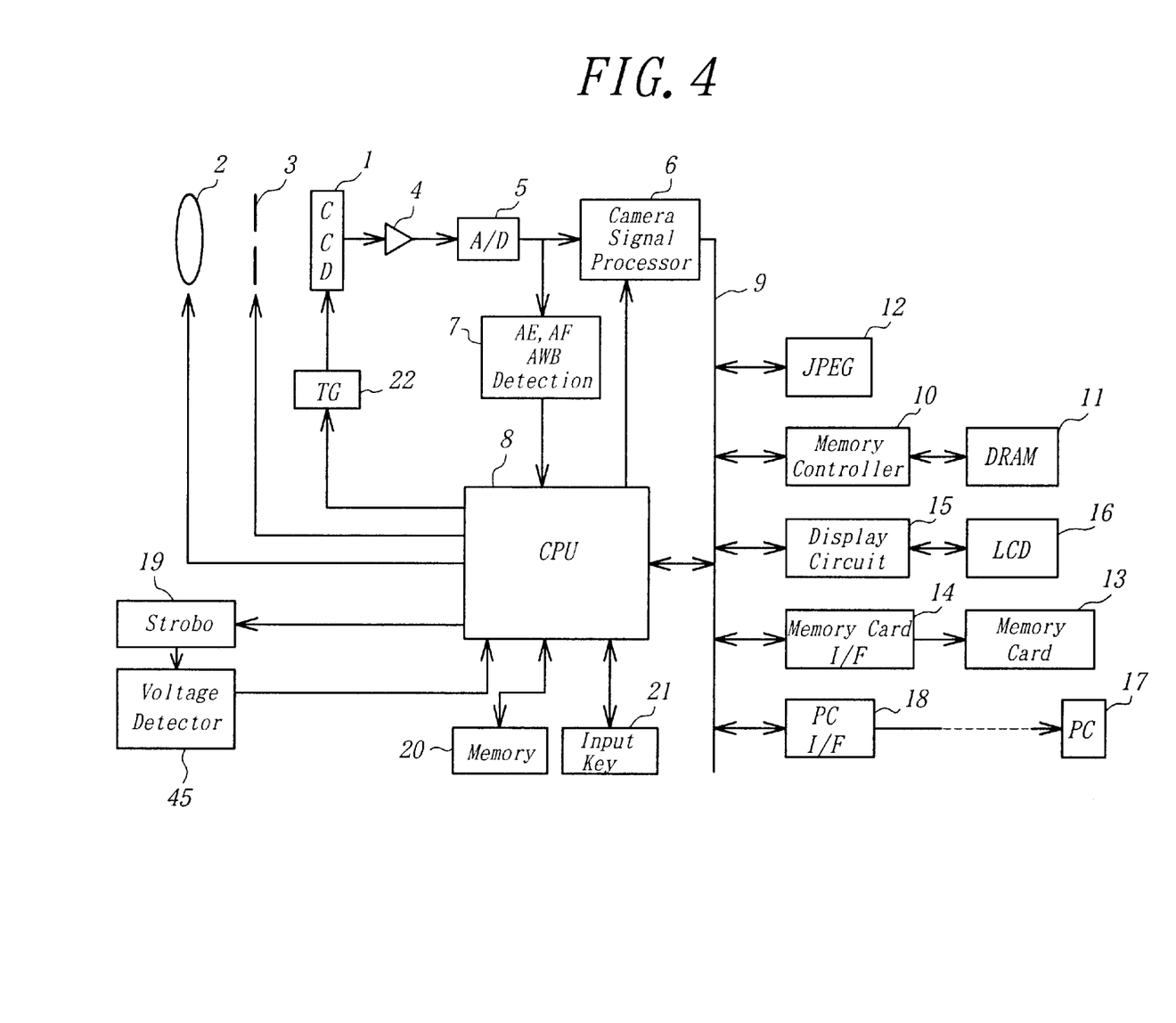
FIG. 4 is a block diagram depicting a third embodiment of the electronic camera according to the invention.

FIG. 4 is a block diagram illustrating a third embodiment of the electronic camera according to the invention. In the third embodiment, there is provided a voltage detecting means 45 for detecting the voltage across the light emission capacitance 34. The detected voltage is compared in the CPU 8 with the reference voltage appearing across the fully charged light emission capacitance 34, and desired exposure control data values are selected from the table in accordance with a comparison result.

Figure 5:
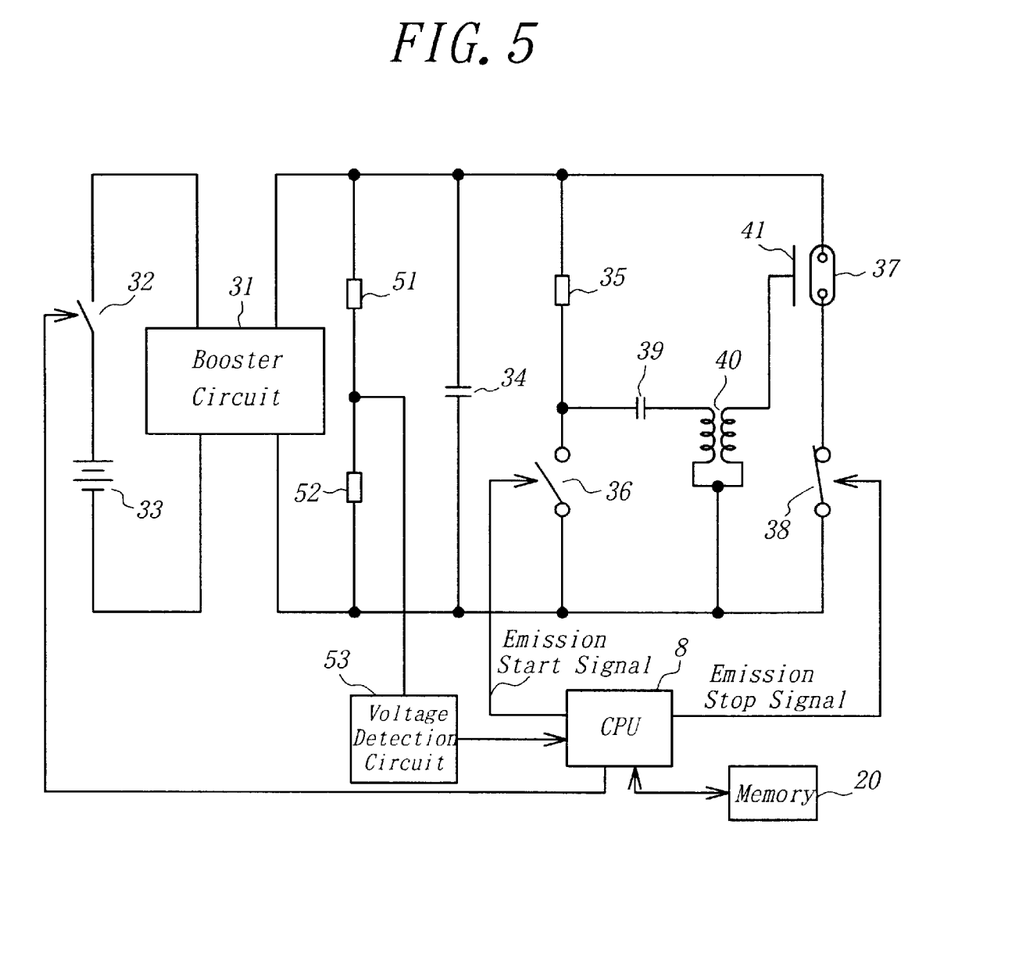
FIG. 5 is a circuit diagram showing an embodiment of a voltage detecting means illustrated in FIG. 4.

FIG. 5 is a circuit diagram showing an embodiment of the voltage detecting means 45. The voltage detecting means 45 includes a series circuit of resistors 51 and 52 connected across the light emission capacitance 34, and a voltage detecting circuit 53 connected to a junction between these resistors. The voltage across the light emission capacitance 34 is divided by the voltage divider consisting of the resistors 51, 52 and the divided voltage is detected by the voltage detecting circuit 53. An analog signal representing the detected voltage value is converted by an A/D converter into digital data and the thus converted digital data is supplied to the CPU 8.

In general, an exposure amount of the stroboscobic flash is proportional to the charged voltage of the light emission capacitance 34. Therefore, a proportional constant is stored in the CPU 8, and a step in the exposure control table shifted from a step corresponding to a correct exposure amount in accordance with a comparison result between the voltage detected by the voltage detecting circuit 53 and the reference voltage is selected.

For instance, it is assumed that each time the charged voltage across the light emission capacitance 34 is decreased with respect to the reference voltage by 15 volts, an exposure amount is reduced by 0.3 EV. When the charged voltage is lower than the reference voltage by 30 volts, a step which is lower than a step corresponding to a correct exposure amount by 0.6 EV is selected. That is to say, in case of using the above explained exposure control table 1 in which successive steps has a difference of 0.1 EV, when a step 20 corresponds to a correct exposure amount, a step 14 which is lower than the step 20 by six steps is selected, and the stroboscopic flash is controlled in accordance with light emitting times denoted in the selected step 14. This may be also applied to the second embodiment.

As explained above, in the third embodiment, even if the light emission capacitance 34 is not charged up to the reference voltage, the two image pick-up operations can be performed with the predetermined exposure amount ratio in accordance with much more accurate exposure control data values, and therefore the composed image having a higher quality can be obtained.

Figure 8:
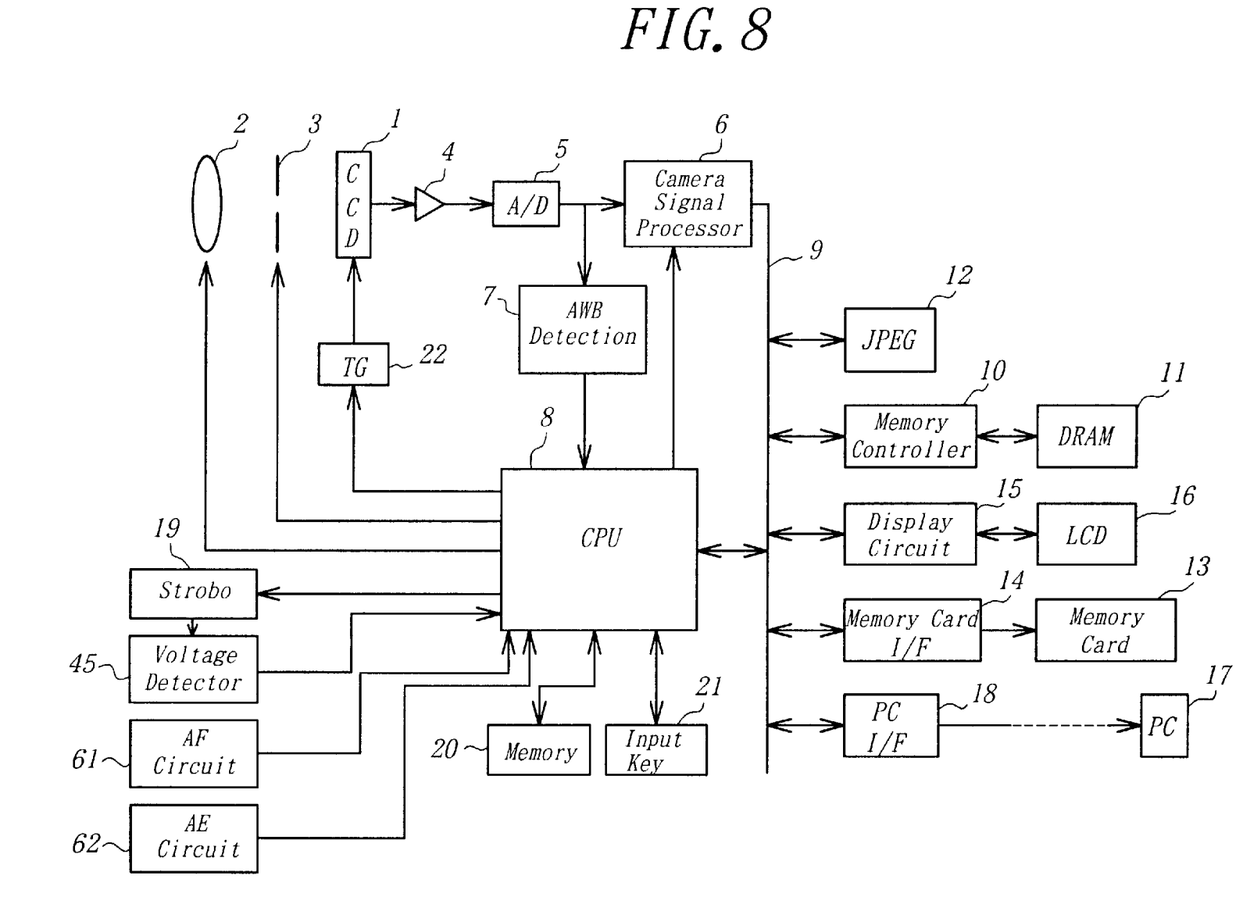
FIG. 8 is a block diagram illustrating another modified embodiment of the electronic camera according to the invention.

In a fourth embodiment of the electronic camera according to the invention, the stop value of the stop-shutter mechanism 3 is controlled by means of the CPU 8 in accordance with an image picking-up condition determined by the AF information or AE information supplied from the AF, AE, AWB detection circuit 7 or separate AF circuit 61 or AE circuit 62 shown in FIG. 8. In the memory 20, there are stored exposure control tables for respective stop values, and the first and second exposures are controlled in accordance with a step selected from a table corresponding to a stop value such that an exposure amount of the second exposure corresponds to a correct exposure amount determined by the AF information or AE information.

That is to say, in the image composing mode with the two stroboscopic flash exposures, the image signal (LE) obtained by the second exposure corresponds to the correct exposure amount determined by the AF information or AE information and the image signal (SE) is obtained by the first exposure whose exposure amount has the predetermined exposure amount ratio. Therefore, when the exposure control table which is formed under such a condition that the stop value is fixed, a distance range over which the image pick-up is possible is narrowed as compared with the conventional stroboscopic flash photography without the image composition.

In the fourth embodiment, when a distance to the object calculated from the AF information is shorter than a shortest distance at which the desired exposure amount can be obtained under the stop value of F2.8, the stop value of the stop-shutter mechanism 3 is changed from F2.8 to F5.6, and a step is selected from an exposure control table corresponding to the stop value F5.6 in accordance with the AF information or AE information.

When the stop value is changed in the manner explained above, the distance range toward the shorter distance can be widened and the image composition mode can be performed even in a close-up photography.

In the first to fourth embodiments so far explained, an exposure amount of the first exposure and an exposure amount of the second exposure are determined in accordance with the predetermined exposure amount ratio. However, according to the invention, it is not always necessary to previously determine said exposure amount ratio.

In a fifth embodiment of the electronic camera according to the invention, the exposure amount ratio between the first exposure and the second exposure is determined in accordance with the AF information or AE information supplied from the AF, AE, AWB detection circuit 7 or AF circuit 61 or AE circuit 62 shown in FIG. 8. Then, exposure control values for the first and second exposures are selected from the exposure control table stored in the memory 20 in accordance with the determined exposure amount ratio.

In the image composition mode, when the exposure amount ratio between the first and second exposures is fixed to, for instance 3 EV, a usable distance range is narrowed by said exposure amount ratio as compared with the conventional stroboscopic flash photography, and the image picking-up could not be performed at such a short distance. In this embodiment, when a distance to the object calculated from the AF information is shorter than a shortest distance determined by the relevant exposure amount ratio of 3 EV, the exposure amount ratio is changed to a smaller value such as 2 EV. Then, exposure control data values are selected from an exposure control table corresponding to the changed exposure amount ratio of 2 EV, and emission times of the stroboscopic flash for the first and second exposures are controlled in accordance with the selected exposure control data values.

Therefore, when the exposure control table containing exposure control values calculated in accordance with the exposure amount ratio is used like as the first embodiment, a plurality of such tables each corresponding to respective exposure amount ratios are stored in the memory 20, At first, a desired table is selected from said plurality of tables in accordance with a desired exposure amount ratio, and then a desired step is selected from the selected table in accordance with the AF information or AE information. The stroboscopic flash emission can be controlled in accordance with exposure control data values contained in the selected step.

Alternatively, when the exposure control table for the conventional stroboscopic flash photography is commonly used for the image composition mode, a desired step corresponding to the AF information or AE information is first selected as the exposure control data value for the second exposure, and next a desired step which differs from said first exposure by an exposure amount ratio which is determined by the AF information is selected for the first exposure. In this manner, the stroboscopic flash emission for the first and second exposures can be controlled in accordance with exposure control data values contained in the selected steps.

In this manner, by reducing the exposure amount ratio between the first and second exposures in accordance with the distance to the object, a usable range for the shorter distance can be expanded, and like as the fourth embodiment, the image composition can be performed even for an object which is closer to the camera.

Figure 6A:
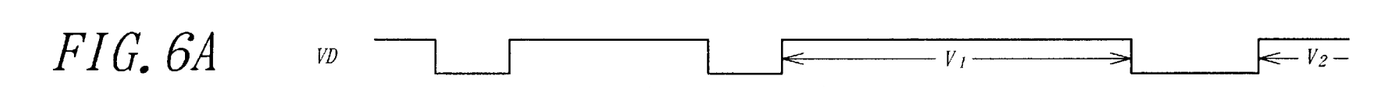
FIGS. 6A–6F are timing charts explaining the operation of a sixth embodiment of the electronic camera according to the invention.
Figures 6B, 6C:
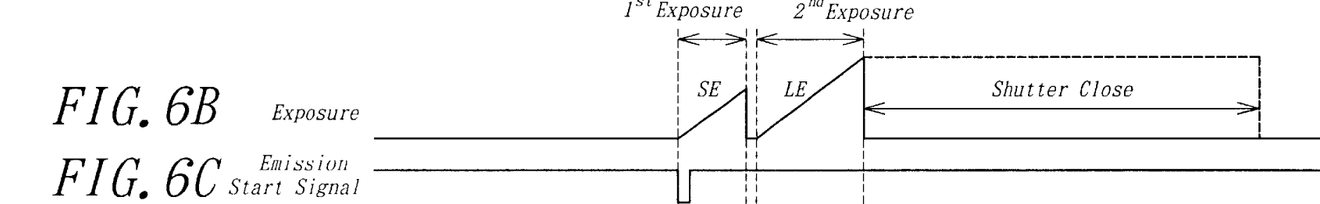
Figure 6D:
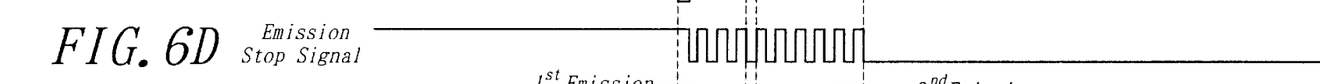
Figure 6E:
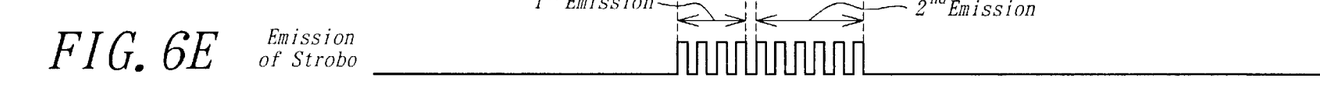
Figure 6F:
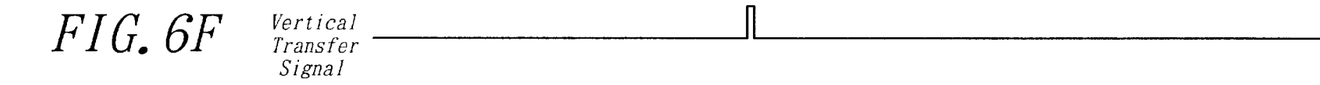

In the respective embodiments explained above, as shown in FIG. 3, the stroboscopic flash device 19 is operated such that the excited light is emitted continuously in each of the first and second exposures. In a sixth embodiment of the electronic camera according to the invention, in each of the first and second exposures, the emission stop signal having a short repetition period is supplied from the CPU 8 to the switch 38 shown in FIG. 2 or FIG. 5 as depicted in FIG. 6D such that the stroboscopic flash is emitted repeatedly from the Xenon tube 27 of the stroboscopic flash device 19. Such a pulsatory light emission is generally called a flat emission.

In the stroboscopic flash photography, when the Xenon tube 37 is driven in the flat emission mode, an mount of light emitted during each of the first and second exposures can be controlled much more precisely. Therefore, the composed image can have a much higher quality.

The present invention is not limited to the embodiments explained above, but many modifications and alternations may be conceived by a person skilled in the art within the scope of the invention. For instance, in the above embodiments, the light emitting times for the first and second exposures are controlled in accordance with exposure control data values in one or more exposure control tables, but according to the invention, the light emitting times for the first and second exposures may be calculated from the AE information as long as a linear relationship is existent between an amount of the excited emission light and the light emitting time.

As explained above, according to the invention, the first exposure is performed by emitting the flash light for a desired time period, the excited light emission is temporarily stopped at the end of the first exposure, and after a short time interval the excited light is again emitted to perform the second exposure for a desired time period. Since the light emitting means is kept in the excited condition even after the first exposure until the end of the second exposure, it is no more necessary to recharge the trigger capacitance prior to the second exposure, the time interval between the first exposure and the second exposure can be very short. Therefore, even if the object contains a moving subject, the composed image can have a very high quality.

Furthermore, since the light emitting time periods of the first and second exposures can be accurately determined in accordance with a desired exposure amount ratio between the first exposure and the second exposure, the composed image can have a very wide dynamic range.

Moreover, when the electrostatic charges stored in the light receiving section of the solid state image sensing element are transferred into the vertical transfer section during the time interval between the first exposure and the second exposure, the image signal obtained by the first exposure can be read out without being affected by noise which might be produced during the excited light emission for the second exposure.

What is claimed is:

1. An electronic camera producing an image having a wide dynamic range by composing two image signals obtained by picking-up an object two times successively with different exposure amounts, comprising:
    an image picking-up means including a solid state image sensing element for picking-up an object to derive an image signal;
    a flash light emitting means for irradiating said object with flash light;
    an image signal composing means for composing two image signals obtained by picking-up the object two times with a desired exposure amount ratio; and
    a flash light emission controlling means for controlling an excited emission of said flash light emitting means in accordance with said desired exposure amount ratio such that upon the first exposure, said flash light emitting means is excited and the flash light is emitted, an excited condition of the flash light emitting means is kept over said second exposure, and after once stopping the light emission at an end of the first exposure, the flash light is emitted again to perform the second exposure.

2. An electronic camera as claimed in claim 1, wherein said flash light emitting means is controlled by said flash light emission controlling means such that flash light is emitted from said flash light emitting means in each of said first and second exposures.

3. An electronic camera as claimed in claim 1, further comprising a mechanical shutter which is closed at the end of the second exposure and is kept to be closed at least until the image signals obtained for the first and second exposures are read out of the solid state image sensing element.

4. An electronic camera as claimed in claim 1, wherein said flash light emission controlling means determines excited light emission time periods for the first and second exposures such that exposure amounts of the first and second exposures correspond to said desired exposure amount ratio between the first exposure and the second exposure.

5. An electronic camera as claimed in claim 1, wherein an exposure amount of said first exposure is smaller than an exposure amount of said second exposure.

6. An electronic camera as claimed in claim 5, wherein said exposure amount of the second exposure corresponds to a desired exposure amount for the object.

7. An electronic camera as claimed in claim 1, wherein said image picking-up means is constructed such that electrostatic charges stored in a light receiving section of the solid state image sensing element during the first exposure are transferred into a vertical transfer section of the solid state image sensing element during the time interval between the first exposure and the second exposure during which the excited light emission is temporarily interrupted.

8. An electronic camera as claimed in claim 7, wherein said flash light emission controlling means includes an exposure control table which represents a plurality of exposure control data values for the first exposure and a plurality of exposure control data values for the second exposure, said exposure control data values determining excited light emission times for the first and second exposures in accordance with said predetermined exposure amount ratio, and the excitation light emission is controlled by selecting, from said exposure control table, exposure control data values corresponding to an image picking-up condition.

9. An electronic camera as claimed in claim 8, wherein said plurality of exposure control data values for the first and second exposures are constructed by exposure control data values for a conventional single exposure in which no image composition is carried out.

10. An electronic camera as claimed in claim 8, wherein said image picking-up means includes a variable stop which is controlled in accordance with a distance from the camera to the object, and exposure control data values for the first and second exposures are selected from said exposure control table on the basis of a stop value of the variable stop.

11. An electronic camera as claimed in claim 8, wherein said exposure amount ratio between the first exposure and the second exposure is predetermined.

12. An electronic camera as claimed in claim 8, wherein said exposure amount ratio between the first exposure and the second exposure is determined in accordance with the image picking-up condition.

13. An electronic camera as claimed in claim 8, wherein said flash light emitting means comprises a flash light source, a trigger capacitance for triggering said flash light source into the excited condition, and a light emission capacitance for supplying a light emitting energy to said flash light source in the excited condition to emit an excited light, whereby said exposure control data values for the first exposure in said exposure control table of said flash light emission controlling means are determined on the basis of a reference voltage of said light emission capacitance, and said exposure control data values for the second exposure are determined on the basis of a voltage across said light emission capacitance which is determined by considering a voltage drop due the excited light emission for the first exposure.

14. An electronic camera as claimed in claim 13, wherein said flash light emitting means further comprises a switching element connected in series with said flash light emitting means and light emission capacitance, and said flash light emission controlling means supplies a light emission stop signal during said time interval between the first exposure and the second exposure to said switching element and switching element is cut off for said time interval to stop the emission of the excited flash light.

15. An electronic camera as claimed in claim 14, wherein said time interval during which said switching element is cut off is set to a value from about 5 $\mu$sec to about 30 $\mu$sec.

16. An electronic camera as claimed in claim 13, wherein said flash light emission controlling means includes a voltage detecting means for detecting a voltage across said light emission capacitance, and the excited light emission is controlled by selecting, from said exposure control table, exposure control data values for the first and second exposures suitable for an exposure condition on the basis of a comparison of the detected voltage with the reference voltage.

17. An electronic camera producing an image having a wide dynamic range by composing two image signals obtained by picking-up an object two times successively with different exposure amounts, comprising:

an image picking-up unit including a solid state image sensing element for picking-up an object to derive an image signal;

a flash light emitting unit for irradiating said object with flash light;

an image signal composing unit for composing two image signals obtained by picking-up the object two times with a desired exposure amount ratio; and a flash light emission controlling unit for controlling an excited emission of said flash light emitting unit in accordance with said desired exposure amount ratio and storing an exposure control table which includes a plurality of exposure control data values for the first exposure and a plurality of exposure control data values for the second exposure, and the excitation light emission is controlled by selecting, from said exposure control table, exposure control data values corresponding to an image picking-up condition, wherein:

said flash light emitting unit comprises a flash light source, a trigger capacitance for triggering said flash light source into the excited condition, and a light emission capacitance for supplying a light emitting energy to said flash light source in the excited condition to emit an exited light, and said exposure control data values for the first exposure in said exposure control table of said flash light emission controlling unit are determined on the basis of a reference voltage of said light emission capacitance, and said exposure control data values for the second exposure are determined on the basis of a voltage across said light emission capacitance which is determined by considering a voltage drop due to the excited light emission for the first exposure.

18. The electronic camera according to claim 17, wherein said flash light emitting unit further comprises a switching element connected in series with said flash light emitting unit and light emission capacitance, and said flash light emission controlling unit supplies a light emission stop signal during a time interval between the first exposure and the second exposure to said switching element and the switching element is cut off for said time interval to stop the emission of the excited flash light.

19. The electronic camera according to claim 18, wherein said time interval during which said switching element is cut off is set to a value from about 5 usec to about 30 usec.

20. The electronic camera according to claim 17, wherein said flash light emission controlling unit includes a voltage directing means for detecting a voltage across said light emission capacitance, and the excited light emission is controlled by selecting, from said exposure control table, exposure control data values for the first and second exposures suitable for an exposure condition on the basis of a comparison of the detected voltage with the reference voltage.

* * * * *